MAGNET CORE BUILT UP FROM TITANIUM-CONTAINING
MANGANESE-ZINC-FERROUS FERRITE AND METHOD
OF MANUFACTURING THE SAME
Filed April 30, 1969
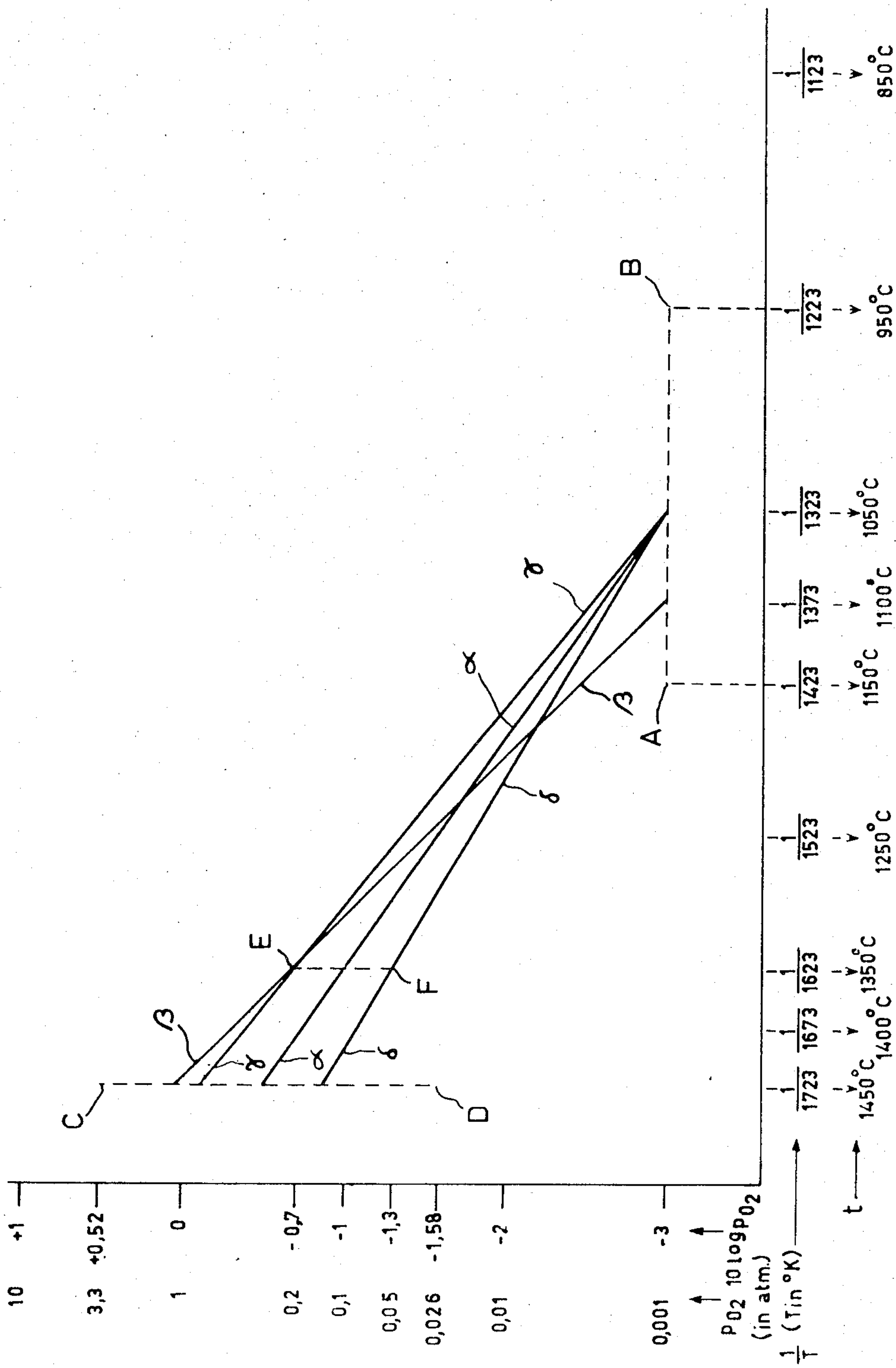
INVENTORS
JACOB KLERK
THEODORUS G.W. STIJNTJES
BY
Frank R. Jufani
AGENT

United States Patent Office 3,645,898
Patented Feb. 29, 1972

3,645,898

MAGNET CORE BUILT UP FROM TITANIUM-CONTAINING MANGANESE-ZINC-FERROUS FERRITE AND METHOD OF MANUFACTURING THE SAME

Jacob Klerk and Theodorus Gerhardus Wilhelmus Stijntjes, Emmasingel, Eindhoven, Netherlands, assignors to U.S. Philips Corporation, New York, N.Y.

Filed Apr. 30, 1969, Ser. No. 820,455
Claims priority, application Netherlands, May 2, 1968, 6806184
Int. Cl. C04b 35/38
U.S. Cl. 252—62.59 5 Claims

ABSTRACT OF THE DISCLOSURE

A magnet core having a temperature factor of the effective magnetic initial permeability which is substantially constant over an extensive temperature range, especially suitable for use in inductance-capacitance filters in which polystyrene capacitors are used. The temperature variability of the capacity of the capacitors in question may then be compensated for by the temperature variability of the filter coils, in which the magnet cores according to the invention serve as core bodies.

The magnet cores according to the invention consist of a ferrite material having a composition lying within the following range of concentration limits of the five-components system $MnO—ZnO—Fe_2O_3—TiO_2—FeO$:

27–40 mol. percent MnO
8–16 mol. percent ZnO
40–49.5 mol. percent $Fe_2O_3$
0.5–7, preferably 2–6 mol. percent $TiO_2$
3–7.5 mol. percent FeO.

These cores are manufactured by mixing MnO, ZnO, $Fe_2O_3$ and $TiO_2$, or compounds which decompose upon heating to form those oxides in proportions yielding upon sintering the aforesaid materials, compacting the oxide mixture into cores which are heated to between 1100° C. and 1450° C. for 30 to 60 minutes and thereafter cooling in an atmosphere containing specified quantities of oxygen.

In carrier wave telephony, inductance-capacitance filters (so-called "LC-filters") are frequently used for realizing separate frequency ranges on behalf of the various channels. The limit value of the frequency at which the damping of the filter with varying frequency begins to increase rapidly (which limit value will be denoted here by the symbol $f_o$) is allowed to vary only slightly with the temperature, since otherwise the channels partly overlap each other so that mixing of speeches occurs. This limit value, $f_o$, is determined by the resonance frequencies ($f_r$) of the LC circuits in the filter. For the resonant frequency the relation $$f_r=\frac{1}{2\pi}\sqrt{\frac{1}{LC}}$$

holds, in which $f_r$ is the resonance frequency in c./s. (Hz), L is the inductance of the filter coil expressed in H (Henry) and C is the capacity of the filter capacitor expressed in F (farad). For a substantially temperature-independent frequency of the LC filter, a substantially temperature-independent value of the product LC is hence required.

For use as a dielectric for the capacitors of the filters in question the material polystyrene has several advantages, inter alia the comparatively low price and the comparatively low loss factor (tan $\delta$). However, the temperature coefficient of the capacity (C) of a polystyrene capacitor is approximately $-150\times10^{-6}$ per ° C. In order to be able to use the said polystyrene capacitors all the same in the said LC-filters, it is necessary to combine said capacitors with coils the temperature dependence of which on the inductance (L) approximately compensates for that of the capacity, C, of the capacitor so that the product LC of the LC-circuits of the filter does again substantially not vary with temperature.

In connection with the endeavours to restrict the dimensions of the channels apparatus as much as possible, one has proceeded to the construction of smaller and smaller filter coils. This again results in endeavours to increase the effective magnetic permeability of the magnetic coil core towards higher values. In order to be able to use the above-mentioned polystyrene capacitors all the same, the coil core must have an adjustable, substantially constant, temperature coefficient ("TC") of the effective magnetic initial permeability ("$\mu_e$") over an extensive temperature range. In order to reach the correct temperature coefficient of the coil, there is started from the temperature factor ("TF") of the coil core. The temperature factor is defined by the formula $$(TF)_{(t_x-t_r)}=\frac{(\mu_e)_{t_x}-(\mu_e)_{t_r}}{(\mu_e)^2_{t_r}\cdot(t_x-t_r)}$$

in which formula $(\mu_e)_{t_x}$ is the value of the effective magnetic initial permeability of the magnet core in question at the temperature $t_x$, while $(\mu_e)_{t_r}$ is the value of the magnetic initial permeability at the reference temperature $t_r$. When the length of the air-gap in the magnet core is zero, $(\mu_e)_{t_x}$ is the magnetic initial permeability of the magnet core material at the temperature $t_x$. Room temperature is generally chosen as the reference temperature. The relationship between the quantities TC and TF is represented by the equation (TC=TFx $\mu_e$).

The invention provides a new class of magnet cores which provides for the above described need. The said magnet cores which are constructed from titanium-containing manganese-zinc-ferrous ferrite are characterized on the one hand by a substantially constant temperature factor, which is adjustable at a given desired value over an extensive temperature range, and on the other hand by a composition within the range defined by the following limit values of the molar percentages of the metal oxides:

27–40 mol. percent MnO
8–16 mol. percent ZnO
40–49.5 mol. percent $Fe_2O_3$
0.5–7 mol. percent $TiO_2$
3–7.5 mol. percent FeO The limits of the titanium content are preferably chosen in accordance with a content of from 2–6 mol percent $TiO_2$.

It is to be noted that the molar percentages of FeO stated above are based on the supposition that all the manganese present in the ferrite is bivalent and all the titanium present in the ferrite is tetravalent.

The manufacture of the magnet cores according to the invention is carried out according to methods commonly used in manufacturing ferrite magnet cores in which a (usually prefired mixture of the oxides of the ferrite-forming metals (of which oxides one or more can be replaced fully or partly by one or more other compounds of the metals in question which are converted into said oxides upon heating) is compressed to the desired shape and then heated at a temperature above 1000° C.

According to the invention, the mixture which is compressed to the desired shape is heated (and hence sintered) in an oxygen-containing atmosphere to a temperature maximum between 1100° C. and 1450° C. The said temperature maximum is preferably maintained for a period of time of from 30 minutes to 60 minutes.

It is recommendable, both during maintaining the temperature maximum and during the subsequent cooling of the shaped sintered body, to adapt the partial oxygen pressure, $p_{O2}$ of the atmosphere in which heating and cooling takes place to the temperature prevailing in said atmosphere in accordance with directives known for similar cases (for which purpose see, for example, British patent specification No. 891,131). In this connection reference is made to the drawing which is a diagram in which the reciprocal values of the temperature T, expressed in degrees Kelvin are plotted on the horizontal axis and the values of the logarithm to the base ten, $10_{\log}p_{O2}$, of the partial oxygen pressure expressed in atmospheres are plotted on the vertical axis. The adaptation of the partial oxygen pressure to the temperature is carried out preferably in such manner that for sintering and cooling of a given oven load, the values of $10_{\log}p_{O2}$ and 1/T associated with each other are situated on a straight line which, subject to being elongated sufficiently far, if required, intersects both the straight-line section A–B and the straight-line section C–D. The location of the diagram points A, B, C and D appears, besides from the above-mentioned diagram, from the following Table G.

TABLE G

| T (in ° C) | T (in ° K) | $p_{O2}$ (in atmospheres) | 1/T | 10/log $p_{O2}$ | Diagram points |
|---|---|---|---|---|---|
| 1,150 | 1,423 | 0.001 | 1/1,423 | −3 | A |
| 950 | 1,223 | 0.001 | 1/1,223 | −3 | B |
| 1,450 | 1,723 | 3.3 | 1/1,723 | +0.52 | C |
| 1,450 | 1,723 | 0.026 | 1/1,723 | −1.58 | D |

An even more accurate adaptation can be realized by ensuring that the above-mentioned straight line, if again elongated sufficiently far, if required, intersects both the straight-line-section E–F and the straight-line section A–B. For the location of the diagram points E and F reference is made to the diagram itself and also to the Table H below.

TABLE H

| T (in ° C) | T (in ° K) | $p_{O2}$ (in atmospheres) | 1/T | 10/log $p_{C2}$ | Diagram points |
|---|---|---|---|---|---|
| 1,350 | 1,623 | 0.2 | 1/1,623 | −0.7 | E |
| 1,350 | 1,623 | 0.05 | 1/1,623 | −1.3 | F |

of purity of the raw material and the condition that during grinding a little iron is taken up by the mixtures as a result of wear of the grinding apparatus (so-called "ground-in" iron) were taken into account. The quantity of ground-in iron is a function of the duration of grinding and for the given griding aggregate it is determined previously empirically. One or more series of rings were compressed from each of the reground prefired mixtures, said rings having an outside diameter of 14.8 mm., an inside diameter of 7.4 mm. and a height of 6.5 mm. Each series was then heated up to the sintering temperature in an oven which was provided with a control apparatus for the partial oxygen pressure $p_{O_2}$, which temperature was then maintained for approximately 45 minutes. The sintered rings were then cooled in and with the oven. At the sintering temperature and during the subsequent cooling the partial oxygen pressure of the oven atmosphere was always adapated to the temperature prevailing said atmosphere so that the relationship $$10_{\log}p_{O_2}=-\frac{c_1}{T}+c_2$$

was satisfied, which T is the temperature in ° K. during sintering and cooling, while $c_1$ and $c_2$ are constants for each series of rings with the treatment and cooling used. During the treatment of the first series of rings, the sintering temperature was 1220° C. while the partial oxygen pressure of the oven atmosphere was controlled so that the linear relationship $$10_{\log}p_{O_2}=-\frac{14314}{T}+7.82$$

was satisfied.

So in this case $c_1=14314$ and $c_2=7.82$. In the diagram shown in figure said linear relationship is represented by the graph "α" which intersects the two above-mentioned line sections A–B and C–D. This graph also satisfies the (more stringent) requirement that it intersects the line section E–F.

A total of 7 series of rings were processed to magnet cores in the above-described manner. In the following table K the sintering temperature, the control of the partial oxygen pressure of the oven atmosphere as a function of the temperature during sintering and during cooling, the indication of the associated graph in the drawing, and the composition of the resulting magnet cores expressed in molar percentages of the oxides MnO, ZnO, $Fe_2O_3$, $TiO_2$ and FeO is stated for each series of rings.

TABLE K

| Series Number | Sintering temperature (° C.) | Control partial oxygen pressure | | | Composition (molecular percent) | | | | |
|---|---|---|---|---|---|---|---|---|---|
| | | $c_1$ | $c_2$ | Graph | MnO | ZnO | $Fe_2O_3$ | $TiO_2$ | FeO |
| 1 | 1,220 | 14,314 | 7.82 | α | 37.5 | 9.3 | 41.0 | 6.1 | 6.1 |
| 2 | 1,220 | 20,500 | 11.95 | β | 32.5 | 12.7 | 48.2 | 1.2 | 5.4 |
| 3 | 1,220 | 16,457 | 9.44 | γ | 35.6 | 10.6 | 43.7 | 4.3 | 5.8 |
| 4 | 1,250 | 16,457 | 9.44 | γ | 35.6 | 10.6 | 43.7 | 4.3 | 5.8 |
| 5 | 1,400 | 12,173 | 6.20 | δ | 35.0 | 11.0 | 44.6 | 3.7 | 5.7 |
| 6 | 1,250 | 16,457 | 9.44 | γ | 35.0 | 11.0 | 44.6 | 3.7 | 5.7 |
| 7 | 1,220 | 14,314 | 7.82 | α | 35.0 | 11.0 | 44.6 | 3.7 | 5.7 |

In order that the invention may be readily carried into effect, one example thereof will now be described in detail. A number of mixtures of manganese carbonate $MnCO_3$, ferric oxide, $Fe_2O_3$, zinc oxide, ZnO, and titanium dioxide, $TiO_2$, differing mutually in quantitative composition were weighed in. These mixtures were ground, dried, prefired (for example, by heating in air for 4 hours) cooled and ground again. Upon weighing-in the degree The graph "γ" just intersects the point E while the graph "δ" just intersects the point F.

The principal magnetic quality values, measured in the resulting magnet cores are recorded in the following table L. The first, extreme left, column of said table contains the numbers of the series (see table K), from which the magnet cores in question were prepared. In the second column are stated the values of the initial permeability (measured in the annular magnet core without air-gap ($\mu_1$). The third column relates to the values of the temperature factor, TF, as already defined, with the associated temperature ranges. The fourth column states the values of the quotient tan $\delta/\mu_i$, of the loss factor tan $\delta$, measured at a frequency of 100 kc./s. (likewise in the annular magnet core, without air-gap) and $\mu_i$ is the initial permeability, the fifth column states that of the disaccomodation factor, DF, defined by the equation $$DF=\frac{(\mu_i)_{10}-(\mu_i)_{100}}{(\mu_i)_{10'^2}}$$

in which $(\mu_i)_{10}$, is the magnetic initial permeability 10 minutes after demagnetization of the core and $(\mu_i)_{100}$, is the same quantity 100 minutes after demagnetization of the core, the sixth column states that of the resistivity $\rho$ expressed in ohm. cm., while the last, extreme right, column indicates the Curie point values.

TABLE L

| Series No. | $\mu_i$ | Temperature factor: Temperature traject | Temperature factor: TF×10⁶ | tgδ×10⁶$\mu_i$ (100 kHz.) | DF×10⁶ | $\rho$ (ohm-cm.) | Curie-point (° C.) |
|---|---|---|---|---|---|---|---|
| 1 | 1,470 | 0° C. till +23° C. | 1.2 | 2.1 | 2 | 1,000 | 205 |
| | | +23° C. till +180° C. | 1.0 | | | | |
| 2 | 960 | 0° C. till +23° C. | 1.4 | 4.4 | 3 | 550 | 200 |
| | | +23° C. till +180° C. | 1.2 | | | | |
| 3 | 1,400 | −90° C. till +23° C. | 1.3 | 2.0 | 1 | 1,800 | 205 |
| | | +23° C. till +150° C. | 1.1 | | | | |
| 4 | 1,500 | −70° C. till +23° C. | 1.5 | 2.3 | 2 | 2,400 | 200 |
| | | +23° C. till +150° C. | 1.5 | | | | |
| 5 | 1,870 | −30° C. till +23° C. | 0.5 | 3.1 | 1 | 1,100 | 200 |
| | | +23° C. till +85° C. | 0.5 | | | | |
| 6 | 1,300 | −60° C. till +23° C. | 1.4 | 2.5 | 3 | 2,400 | 200 |
| | | +23° C. till +170° C. | 1.2 | | | | |
| 7 | 1,480 | −40° C. till +23° C. | 1.0 | 2.2 | 2 | 2,000 | 200 |
| | | +23° C. till +160° C. | 0.9 | | | | |

The measured values of $$\mu_i,\ \frac{\tan\delta}{\mu}$$

DF and $\rho$ stated in the Table L relate to measurements performed at room temperature (20° C.).

Upon providing the air-gap in the magnet cores, the effective initial permeability, $\mu_e$ can be adjusted so that when the core is used in an LC-circuit with polystyrene capacitors the best temperature compensation is realized. As already stated, the temperature coefficient of a polystyrene capacitor is approximately $-150\times10^{-6}$ per ° C. So the temperature compensation aimed at is achieved when the requirement $$\mu_e=\frac{150\times10^{-6}}{TF}$$

is satisfied, in which TF is the temperature factor of the magnet core. For example, for the magnet cores prepared from series 4, with a TF of $1.5\times10^{-6}$, the value 100 is the value of the effective initial permeability which is most favourable for a good temperature compensation.

What is claimed is:

1. A method of manufacturing a magnet core having a substantially constant temperature factor of the effective magnetic initial permeability over a temperature range extending from −90° C. to +180° C. comprising the steps of forming a mixture of MnO, ZnO, $Fe_2O_3$ and $TiO_2$ in proportions forming upon heating a core consisting of:

27–40 mol percent MnO
8–16 mol percent ZnO
40–49.5 mol percent $Fe_2O_3$
0.5–7 mol percent $TiO_2$ and
3–7.5 mol percent FeO, compacting said mixture into a core, heating said core to a temperature between 1100° C. and 1450° C., maintaining said core at said temperature for about 30 to 60 minutes, and thereafter cooling said core, said core being heated and cooled in an atmosphere having a partial oxygen pressure $p_{O_2}$ satisfying the condition, $$10_{\log}p_{O_2}=-\frac{C_1}{T}+c_2$$

in which T is the temperature in ° K. and $C_1$ and $C_2$ are constants the values of which are such that at a value of $p_{O_2}=0.001$ atmosphere, the temperature is between 950° C., and 1150° C. and that at a temperature of 1450° C., the value of $p_{O_2}$ lies between 0.026 and 3.3 atmospheres.

2. A method as claimed in claim 1 wherein the values of the constants $C_1$ and $C_2$ are such that at a temperature of 1350° C. the value of $p_{O_2}$ is between 0.05 and 0.2 atmospheres.

3. A method as claimed in claim 1 in which the oxides are mixed in proportions forming upon heating a core consisting of:

27–40 mol percent MnO
8–16 mol percent ZnO
40–49.5 mol percent $Fe_2O_3$
2–6 mol percent $TiO_2$
3–7.5 mol percent FeO.

4. A magnetic core having a substantially constant temperature factor of the effective magnetic initial permeability over a temperature range extending from −90° C. to +180° C. and a composition consisting of:

27–40 mol percent MnO
8–16 mol percent ZnO
40–49.5 mol percent $Fe_2O_3$
0.5–7 mol percent $TiO_2$, and
3–7.5 mol percent FeO, said core being made in accordance with the method as defined in claim 1.

5. A magnetic core having a substantially constant temperature factor of the effective magnetic initial permeability over a temperature range extending from −90° C. to +180° C. and a composition consisting of:

27–40 mol percent MnO
8–16 mol percent ZnO
40–49.5 mol percent $Fe_2O_3$
2–6 mol percent $TiO_2$, and
3–7.5 mol percent FeO.

said core being made in accordance with the method as defined in claim 1.

References Cited

UNITED STATES PATENTS

| | | | |
|---|---|---|---|
| 3,027,327 | 3/1962 | Blank | 252—62.62 |
| 3,106,534 | 10/1963 | Akashi et al. | 252—62.59 |
| 3,154,493 | 10/1964 | Pierrot et al. | 252—62.62 |
| 3,492,236 | 1/1970 | Ross | 252—62.59 |

TOBIAS E. LEVOW, Primary Examiner

J. COOPER, Assistant Examiner

U.S. Cl. X.R.

252—62.62